J. H. MITCHELL.
Shovel-Plow.

No. 25,434.

Patented Sept. 13, 1859

UNITED STATES PATENT OFFICE.

JONATHAN H. MITCHELL, OF GERMANTOWN, TENNESSEE.

IMPROVEMENT IN COTTON-SCRAPERS.

Specification forming part of Letters Patent No. 25,434, dated September 13, 1859.

*To all whom it may concern:*

Be it known that I, J. H. MITCHELL, of Germantown, in the county of Shelby and State of Tennessee, have invented a new and useful Improvement in Cotton-Scrapers, of which the following is a full, clear, and exact description, reference being had to the accompanying drawings, which make part of this specification, and in which—

Figure 1:
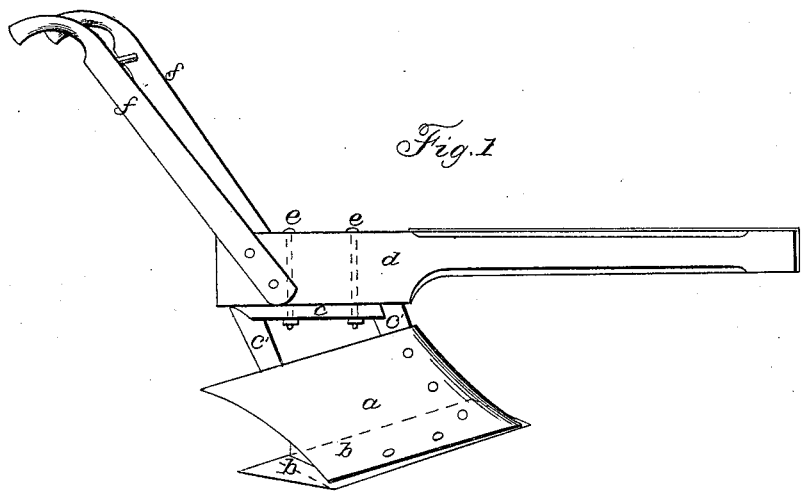
Figure 2:
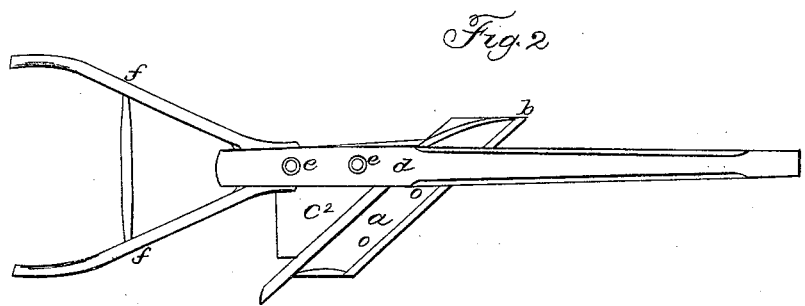
Figure 3:
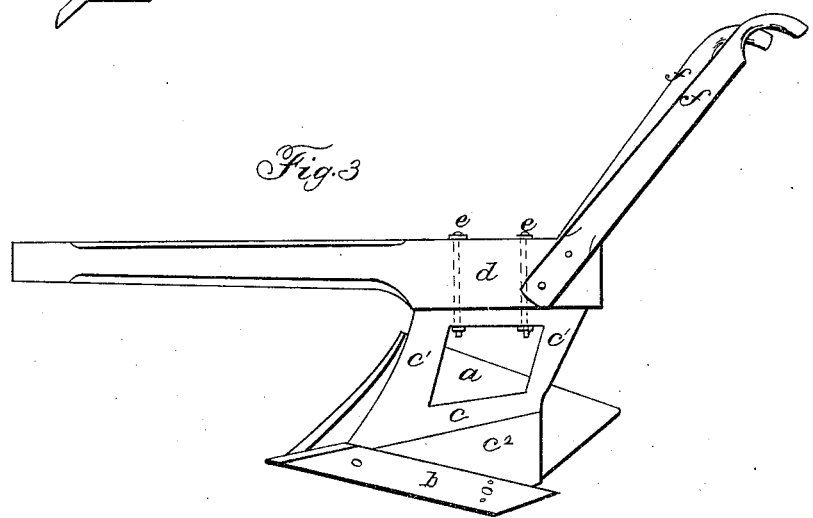

Figure 1 represents a view in perspective of the furrow side of a cotton-scraper with my improvement applied thereto, showing more particularly the position of the share or blade relatively to the plane of the ground when the beam of the scraper is parallel to said plane. Fig. 2 represents a plan or top view of the same, showing the arrangement of parts by which the horse is allowed to travel in the center of the furrow while the scraper acts in close proximity to the standing crop; and Fig. 3 represents a view in perspective of the landside of the same, the position of the parts being similar to that shown in Fig. 1.

My invention relates to those agricultural implements that are more particularly adapted to scraping cotton; and it consists in so arranging the several parts of the scraper as to perfectly clean the ridge up or nearly up to the standing stalks without carrying the beam of the scraper so near them as to injure the plant, and at the same time, like the common scraper, throw the dirt and weeds to the center of the furrow, and this, too, while the beam is held parallel to the plane of the ground and in the most favorable line of draft. To accomplish these objects I set the bottom of the chair, to which the mold-board and share are attached, at an angle of about sixty degrees to its upper part and to a line perpendicular to the beam, so so that while the upper part of the chair occupies a vertical position and the beam is parallel to the surface of the ground the edge of the share may run parallel and close to the side of the ridge and effectually perform its work. By this arrangement the further advantage is also gained that almost the entire weight of the scraper is thrown upon the side of the ridge, and the work consequently much better done than it would be by a machine the weight of which rested upon the central portion of the furrow.

The accompanying drawings represent a cotton-scraper having a beam, $d$, to which handles $f$ of any suitable form may be secured in a proper manner.

To the under side of the beam a chair, $c$, is attached by means of nuts and bolts $e$. The standards $c'$ of the chair are in the same vertical plane as the beam, and inclined slightly forward; but its bottom $c^2$ is inclined to the standard at an angle of about sixty degrees, instead of being at right angles thereto, as usual.

A mold-board, $a$, is secured to the front edge of the chair, which is inclined and beveled to a proper angle for that purpose in any suitable manner.

The share $b$ is made sharp on both edges and secured to the under side of the share $c$ in such manner that it may be reversed to bring the other edge into action when one becomes dull. Its angle relatively to the beam may also be varied by moving its rear end toward or from the heel of the scraper. It may also be fastened to the upper side of the lower edge of the mold-board, instead of to the chair, in which case it will, in addition to its other functions, also act as a self-sharpener.

The chair and mold-board may be made of either wrought or cast iron, and either separately or in one piece, as may be deemed most desirable by the constructer. The share may also be made of iron, if desired; but I prefer to make it of steel.

The operation of the machine is as follows: A horse being harnessed to the scraper in the usual way, the driver takes hold of the handles and guides the scraper along the side of the ridge, with the front point of the share close to the stalks and its rear point running in the bottom of the furrow. Each end of the share is sloped off at an angle of about forty-five degrees to its edge or side. The front edge of the share runs close to the side of the ridge and parallel to it and skims off the weeds, &c., and the mold-board throws them into the center of the furrow, in which the horse also walks, and thus avoids trampling the crop, while, owing to my peculiar arrangement, the scraper works as steadily, easily, and with as little fatigue to the driver as an ordinary scraper working on a level surface. By this means the work of scraping cotton is much more effectively performed than by any plan heretofore devised.

Having thus fully described the construction and operation of my improved scraper, what I claim therein as new, and desire to secure by Letters Patent, is—

1. The combination and arrangement of the beam *d*, chair *c*, mold-board *a*, and share *b*, when operating substantially as herein set forth.

2. The adjustable and changeable share *b*, when constructed, arranged, and operating substantially as and for the purpose set forth.

In testimony whereof I have hereunto subscribed my name.

J. H. MITCHELL.

Witnesses:
 G. W. WATSON,
 P. T. SCRUGGS.